(12) United States Patent
Asao et al.

(10) Patent No.: US 6,198,187 B1
(45) Date of Patent: Mar. 6, 2001

(54) AUTOMOTIVE ALTERNATOR

(75) Inventors: Yoshihito Asao; Toshiaki Kashihara, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,837

(22) Filed: Oct. 15, 1999

(30) Foreign Application Priority Data

May 26, 1999 (JP) .................................................. 11-146277

(51) Int. Cl.[7] .................................................... H02K 19/36
(52) U.S. Cl. ............................................................ 310/68 D
(58) Field of Search ............................ 310/68 D; 363/145

(56) References Cited

U.S. PATENT DOCUMENTS

| | | | |
|---|---|---|---|
| 5,682,070 | * 10/1997 | Adachi et al. ........................ | 310/71 |
| 5,729,063 | 3/1998 | Adachi et al. ........................ | 310/68 |
| 6,081,054 | * 6/2000 | Kashihara et al. .................. | 310/68 D |
| 6,100,613 | * 8/2000 | Tanaka et al. ...................... | 310/68 D |
| 6,121,699 | * 9/2000 | Kashihara et al. .................. | 310/68 D |

FOREIGN PATENT DOCUMENTS 8-182279   7/1996   (JP) ............................... H02K/19/36

* cited by examiner

*Primary Examiner*—Karl Tamai
(74) *Attorney, Agent, or Firm*—Sughrue, Mion, Zinn, Macpeak & Seas, PLLC

(57) ABSTRACT

A positive-side heat sink and a negative-side heat sink are both disposed on a generally flat plane perpendicularly intersecting a shaft, the longitudinal direction of the positive-side diodes secured to the radially inner positive-side heat sink being disposed along the radial direction of the positive-side heat sink, and the longitudinal direction of the negative-side diodes secured to the radially outer negative-side heat sink being disposed along the circumferential direction of the negative-side heat sink.

8 Claims, 8 Drawing Sheets

AUTOMOTIVE ALTERNATOR

BACKGROUND OF THE INVENTION

1. Field of the Invention

The present invention relates to an automotive alternator comprising a rectifier for converting an alternating current generated in a stator coil into a direct current.

2. Description of the Related Art

FIG. 10 is a cross-section of a conventional automotive alternator. This alternator includes: a case 3 comprising an aluminum front bracket 1 and an aluminum rear bracket 2; a shaft 6 disposed in the case 3 to one end of which a pulley 4 is secured; a Lundell-type rotor 7 secured to the shaft 6; a stator 8 secured to the inner wall of the case 3; slip rings 9 secured to the other end of the shaft 6 for supplying electric current to the rotor 7; a pair of brushes 10 moving in contact with the slip rings 9; a brush holder 11 accommodating the brushes 10; a rectifier 12 electrically connected to the stator 8 for converting alternating current generated in the stator 8 into direct current; a heat sink 17 fitted over the brush holder 11; and a regulator 18 attached to the heat sink with adhesive for adjusting the alternating current generated in the stator 8.

The rotor 7 includes: a rotor coil 13 for generating magnetic flux by passing electric current therethrough; and a pole core 14 disposed so as to cover the rotor coil 13 in which magnetic poles are produced by the magnetic flux generated by the rotor coil 13. The pole core 14 includes a first pole core assembly 21 and a second pole core assembly 22 which mutually interlock. Centrifugal fans 5 for cooling are welded to the axial ends of the first pole core assembly 21 and second pole core assembly 22.

The stator 8 includes: a stator core 15; and a stator coil 16 composed of wire wound onto the stator core 15 in which an alternating current is generated by changes in the magnetic flux from the rotor coil 13 as the rotor 7 rotates.

The rectifier 12 includes: a positive-side heat sink 24 having a plurality of fins 24a on the reverse side arranged in an arc shape; four positive-side diodes 23 secured by soldering to the upper surface of the positive-side heat sink 24; an arc-shaped negative-side heat sink 26; four negative-side diodes 25 secured by soldering to the negative-side heat sink 26; and a circuit board 27 for electrically connecting each of the diodes 23, 25 to the stator coil 16, the rectifier 12 converting the three-phase alternating current generated by the stator 8 into a direct current.

The positive-side heat sink 24 and the negative-side heat sink 26 are disposed on a generally flat plane intersecting the shaft 6 perpendicularly, and are housed inside the case 3. The positive-side heat sink 24 and the negative-side heat sink 26 are composed of aluminum which has high thermal conductivity, and the radially outer negative-side heat sink 26 is grounded by direct attachment to the case 3.

The positive-side diodes 23 and negative-side diodes 25 have square bases in both cases, and the overall shape thereof is formed by molding resin in a rectangular shape in order to protect connecting portions of lead terminals projecting from one side thereof.

In a vehicle alternator of the above construction, a current is supplied by a battery (not shown) through the brushes 10 and slip rings 9 to the rotor coil 13, whereby magnetic flux is generated, giving rise to a magnetic field and at the same time, the pulley 4 is driven by the engine and the rotor 7 is rotated by the shaft 6, so that a rotating magnetic field is imparted to the stator coil 16 and electromotive force is generated in the stator coil 16. This alternating electromotive force passes through the positive-side diodes 23 and the negative-side diodes 25 of the rectifier 12 and is converted into direct current, the magnitude thereof is adjusted by the regulator 18, and the battery is recharged.

While the alternator is generating power, the rotor coil 13, the stator coil 16, the positive-side diodes 23, the negative-side diodes 25, and the regulator 18 are constantly generating heat. For example, in an alternator with a rated output current in the 100 A class, the amount of heat generated is 60 W in the rotor coil 13, 500 W in the stator coil 16, a total of 120 W in the positive-side diodes 23 and the negative-side diodes 25, and 6 W in the regulator 18. The excessive generation of heat causes deterioration in the performance of the alternator and reduces the working life of the parts.

For that reason, the fans 5 are rotated together with the rotation of the rotor 7, external air is introduced into the case 3 from openings A in the case 3 by this rotation, and the external air flows as indicated by the arrow M in FIG. 10, cooling the negative-side heat sink 26, the negative-side diodes 25, the positive-side heat sink 24, and the positive-side diodes 23. The external air then flows radially outwards from the fans 5, cools the end portions of the stator coil 16 in the rear end, and is expelled to the outside through openings B.

External air is also introduced into the case 3 from openings C by the rotation of the fans 5, and the external air flows as indicated by the arrow N in FIG. 10, cooling the power transistors of the regulator 18. The external air then flows radially outwards from the fans 5, cools the end portions of the stator coil 16 in the rear end, and is expelled to the outside through openings D.

Similarly, external air introduced through openings E in the front bracket 1 flows radially outwards from the fans 5, cooling the end portions of the stator coil 16 in the front end. The external air is then expelled outside the case 3 through openings F.

In an automotive alternator of the above construction, the lead wires of the positive-side diodes 23 and the lead wires of the negative-side diodes 25 are disposed so as to face each other, in other words, the positive-side diodes 23 and the negative-side diodes 25 are radially aligned with each other in order to facilitate electrical connection of the lead wires of the positive-side diodes 23 and the lead wires of the negative-side diodes 25 to the circuit board 27.

In this case, a problem has been that although the circuit board 27 and the lead wires of each of the diodes 23, 25 can be connected without taking up space and the electrical connection is easily made, because the longitudinal axes of the negative-side diodes 25 are lined up radially, the radial dimension of the radially outer negative-side heat sink 26 is enlarged, and the radial dimension (Y in FIG. 12) of the heat sink 26 is the same as or greater than the radial dimension (X in FIG. 12) of the radially inner positive-side heat sink 24 (Y>X), making size reductions impossible.

Furthermore, another problem has been that after the external air passes through the air gaps between the negative-side diodes 25 as indicated by the Arrows P in FIG. 12, it passes through the air gaps between the positive-side diodes 23, but since the volume of air which can pass through is determined by the dimensions of the air gaps between the positive-side diodes 23, unwanted spaces exist within the radially outer negative-side heat sink 26 which do not contribute to increasing the passage of external air, that is, which do not contribute to improving the cooling of the negative-side diodes 25.

Yet another problem has been that the outer circumferential side of the negative-side heat sink 26 is the side from which the external air is introduced and the temperature of the external air is low there, the temperature of the negative-side heat sink 26 rising towards the inner circumferential side, but because the longitudinal axes of the negative-side diodes 25 are lined up radially, the radial dimension of the radially outer negative-side heat sink 26 is enlarged, and the high-temperature regions of the negative-side heat sink 26 occupy a correspondingly larger portion, causing certain points on the inner circumferential side of the negative-side diodes 25 to have locally high temperatures.

SUMMARY OF THE INVENTION

The present invention aims to solve the above problems and an object of the present invention is to provide an automotive alternator enabling the radial dimensions of a rectifier to be reduced, as well improving the cooling efficiency of diodes secured to a radially outer heat sink.

To this end, according to the present invention, there is provided an automotive alternator comprising: a case; a shaft rotatably disposed inside said case; a rotor secured to the shaft; a stator secured to the inner wall of the case being provided with a stator coil composed of wire wound onto a stator core; and a rectifier disposed inside the case and electrically connected to the stator coil for converting alternating current generated in the stator coil to direct current, said rectifier including: a plurality of rectangular positive-side diodes secured to a surface of an arc-shaped positive-side heat sink; and a plurality of rectangular negative-side diodes secured to a surface of an arc-shaped negative-side heat sink, the positive-side heat sink and the negative-side heat sink having different inside diameters and being both disposed on a generally flat plane perpendicularly intersecting the shaft, the longitudinal direction of each of the diodes secured to the radially inner heat sink of the positive-side and negative-side heat sinks being disposed along the radial direction of the heat sink, the longitudinal direction of each of the diodes secured to the radially outer heat sink being disposed along the circumferential direction of the heat sink, the diodes secured to the radially outer heat sink and the diodes secured to the radially inner heat sink being cooled by external air introduced into the case by the rotation of fans mounted to the rotor.

DETAILED DESCRIPTION OF THE PREFERRED EMBODIMENTS

Embodiment 1

Figure 1:
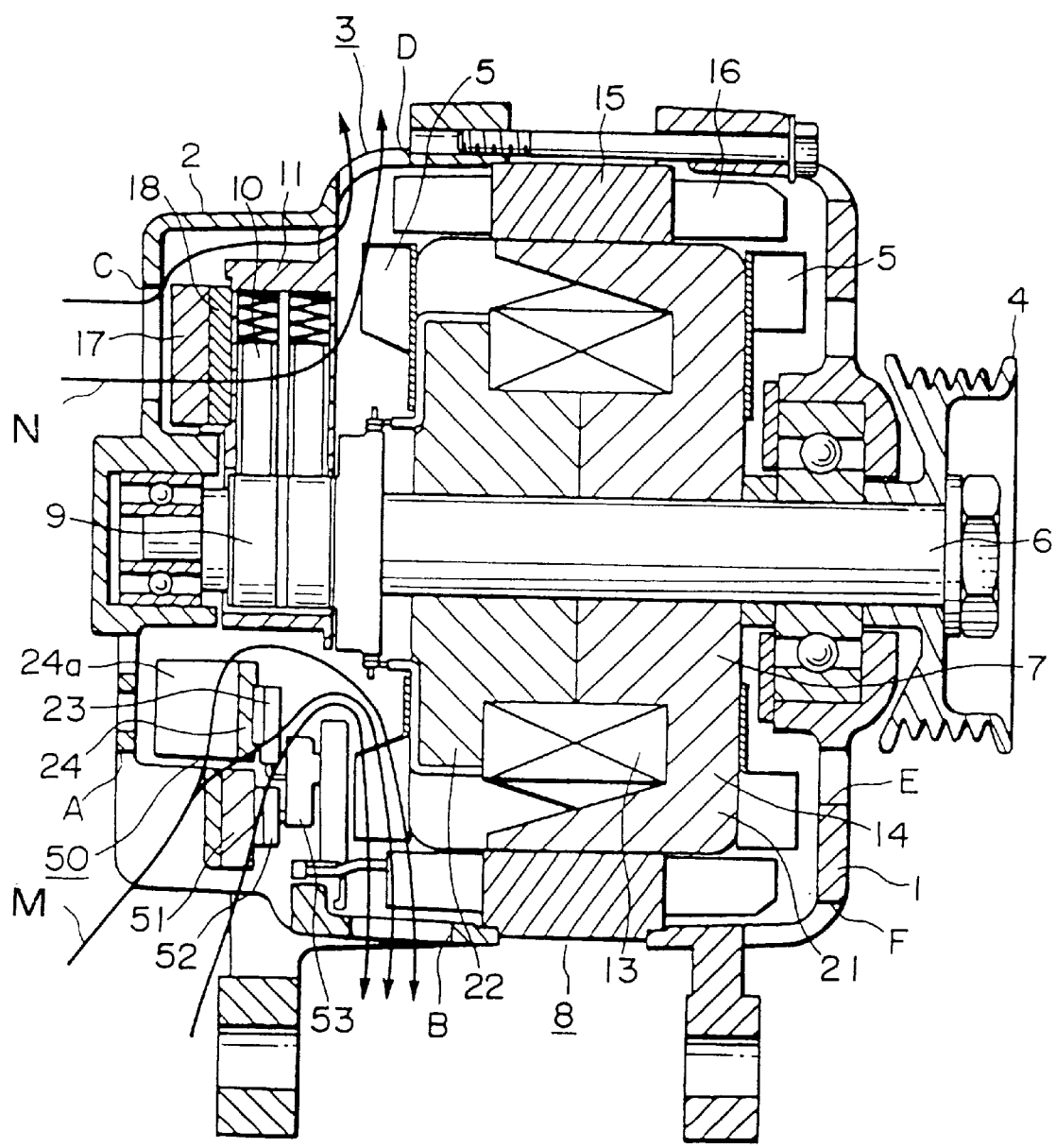
FIG. 1 is a normal cross-section of an automotive alternator according to Embodiment 1 of the present invention.

FIG. 1 is a cross-section of an automotive alternator according to Embodiment 1 of the present invention. This alternator includes: a case 3 comprising an aluminum front bracket 1 and an aluminum rear bracket 2; a shaft 6 disposed in the case 3 to one end of which a pulley 4 is secured; a Lundell-type rotor 7 secured to the shaft 6; a stator 8 secured to the inner wall of the case 3; slip rings 9 secured to the other end of the shaft 6 for supplying electric current to the rotor 7; a pair of brushes 10 moving in contact with the slip rings 9; a brush holder 11 accommodating the brushes 10; a rectifier 50 electrically connected to the stator 8 for converting alternating current generated in the stator 8 into direct current; a heat sink 17 fitted over the brush holder 11; and a regulator 18 attached to the heat sink with adhesive for adjusting the alternating current generated in the stator 8.

The rotor 7 includes: a rotor coil 13 for generating magnetic flux by passing electric current therethrough; and a pole core 14 disposed so as to cover the rotor coil 13 in which magnetic poles are produced by the magnetic flux generated by the rotor coil 13. The pole core 14 includes a first pole core assembly 21 and a second pole core assembly 22 which mutually interlock. Centrifugal fans 5 for cooling are welded to the axial ends of the first pole core assembly 21 and second pole core assembly 22.

The stator 8 includes: a stator core 15; and a stator coil 16 composed of wire wound into the stator core 15 in which alternating current is generated by changes in the magnetic flux from the rotor coil 13 as the rotor 7 rotates.

The rectifier 12 includes: a positive-side heat sink 24 having a plurality of fins 24a on the reverse side arranged in an arc shape; four positive-side diodes 23 secured by welding to the upper surface of the positive-side heat sink 24; an arc-shaped negative-side heat sink 51; four negative-side diodes 52 secured by welding to the negative-side heat sink 51; and a circuit board 53 for electrically connecting each of the diodes 23, 52 to the stator coil 16, and the rectifier 12 converts the three-phase alternating current generated by the stator 8 into direct current.

The positive-side heat sink 24 and the negative-side heat sink 52 are disposed on a generally flat plane intersecting the shaft 6 perpendicularly, and are housed inside the case 3. The positive-side heat sink 24 and the negative-side heat sink 52 are composed of aluminum which has high thermal conductivity, and the radially outer negative-side heat sink 51 is grounded by direct attachment to the case 3.

The positive-side diodes 23 and negative-side diodes 52 have square bases in both cases, and the overall shape thereof is formed by molding resin in a rectangular shape in order to protect connecting portions of lead terminals projecting from one side thereof.

Figure 2:
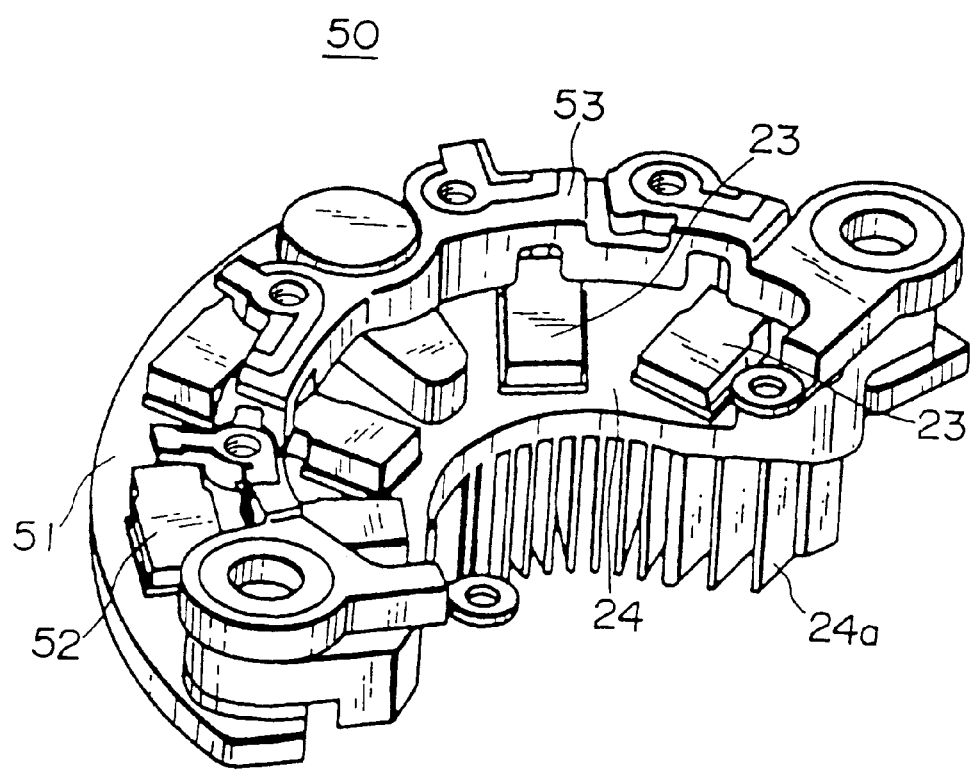
FIG. 2 is a perspective of the rectifier in FIG. 1.
Figure 3:
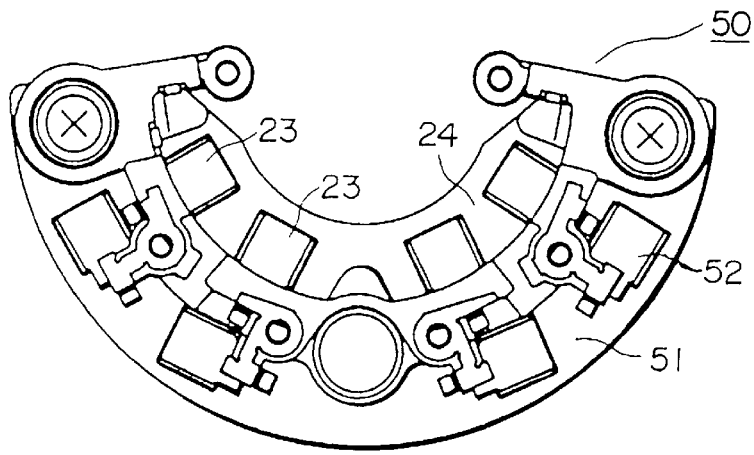
FIG. 3 is a plan of the rectifier in FIG. 2.
Figure 4:
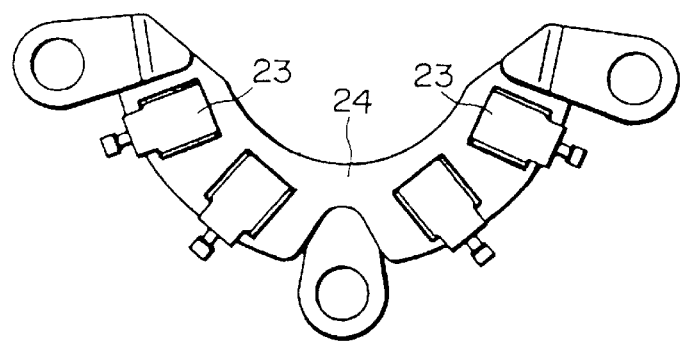
FIG. 4 is a plan of the positive-side diodes fastened to the positive-side heat sink of the rectifier in FIG. 2.
Figure 5:
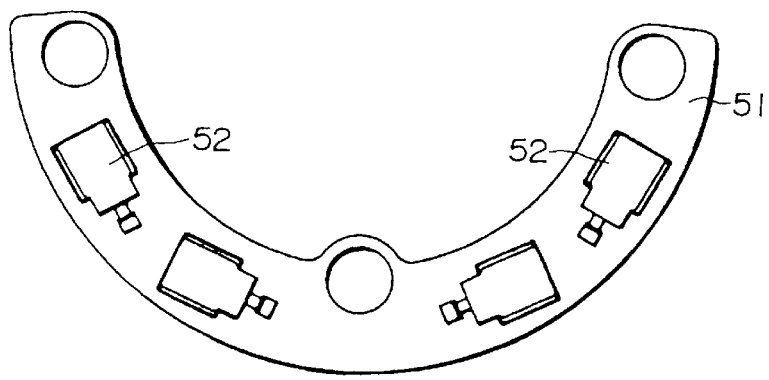
FIG. 5 is a plan of the negative-side diodes fastened to the negative-side heat sink of the rectifier in FIG. 2.

FIG. 3 is a plan of the rectifier 50 in FIG. 2, FIG. 4 is a plan of the positive-side diodes 23 fastened to the positive-side heat sink 24 of the rectifier 50 in FIG. 2, and FIG. 5 is a plan of the negative-side diodes 52 fastened to the negative-side heat sink 51 of the rectifier 50 in FIG. 2.

The rectangular positive-side diodes 23 are the same as in the conventional example, and the longitudinal axes thereof are lined up radially on the positive-side heat sink 24.

On the other hand, the longitudinal axes of the four negative-side diodes 52 are each lined up in the direction of the circumference of the negative-side heat sink 51 on the negative-side heat sink 51 which is disposed radially outwards from the positive-side heat sink 24 in close proximity thereto. The radial dimension of the negative-side heat sink 51 is thereby reduced compared to the conventional negative-side heat sink 26. Contrary to expectations, although the ratio occupied by the negative-side diodes 52 in the direction of the circumference of the negative-side heat sink 51 is increased, because there originally was excess space between the negative-side diodes 52 in the direction of the circumference of the radially outer negative-side heat sink 26, there is no need to change the dimensions thereof in the direction of the circumference of the negative-side heat sink 51.

In an automotive alternator of the above construction, the fans 5 are rotated together with the rotation of the rotor 7, external air is introduced into the case 3 from openings A in the case 3 by this rotation, and the external air flows as indicated by the arrow M in FIG. 1, cooling the negative-side heat sink 51, the negative-side diodes 52, the positive-side heat sink 24, and the positive-side diodes 23. The external air then flows radially outwards from the fans 5, cools the end portions of the stator coil 16 in the rear end, and is expelled to the outside through openings B.

External air is also introduced into the case 3 from openings C by the rotation of the fans 5, and the external air flows as indicated by the arrow N in FIG. 1, cooling the power transistors of the regulator 18. The external air then flows radially outwards from the fans 5, cools the end portions of the stator coil 16 in the rear end, and is expelled to the outside through openings D.

Similarly, external air introduced through openings E in the front bracket 1 flows radially outwards from the fans 5, cooling the end portions of the stator coil 16 in the front end. The external air is then expelled outside the case 3 through openings F.

In this embodiment, the outer circumferential side of the radially outer negative-side heat sink 51 is the side from which the external air is introduced and the temperature of the external air is low there, the temperature of the negative-side heat sink 51 rising towards the inner circumferential side, but because the longitudinal axes of the negative-side diodes 52 are lined up circumferentially, the radial dimension of the negative-side heat sink 51 is reduced, and the high-temperature regions of the negative-side heat sink 51 occupy a correspondingly smaller ratio, improving the cooling efficiency of the negative-side diodes 52.

Moreover, the air gaps between the positive-side diodes 23 and the air gaps between the negative-side diodes 52 are radially aligned, allowing the external air from the centrifugal fans 5 to flow smoothly over the negative-side heat sink 51 and the positive-side heat sink 24.

In an actual experiment involving an automotive alternator according to this embodiment, the results obtained for an external air temperature of 20 degrees C. showed that the temperature of the negative-side heat sink 52 was reduced to 120 degrees C. compared to the conventional 125 degrees C.

Embodiment 2

Figure 6:
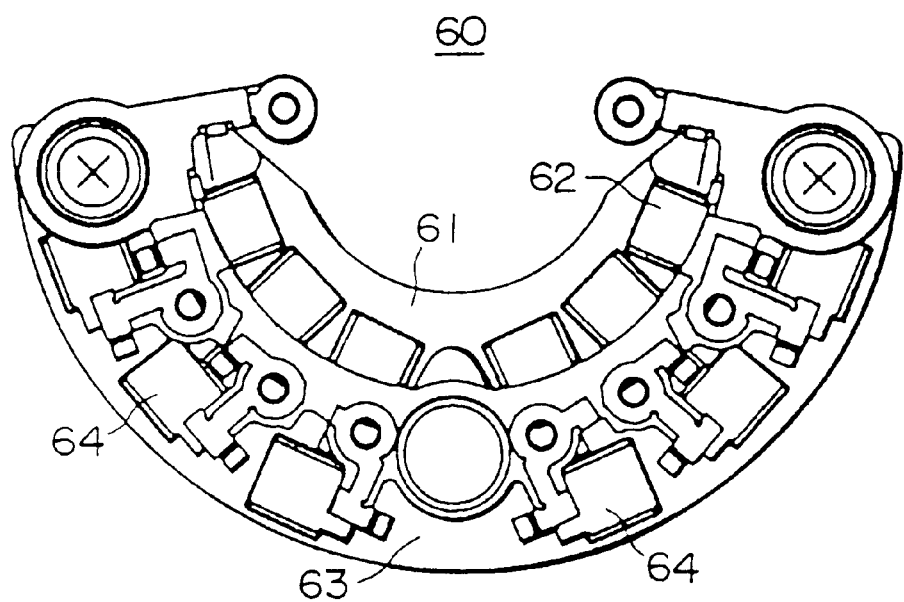
FIG. 6 is a plan of a rectifier for an automotive alternator according to Embodiment 2 of the present invention.
Figure 7:
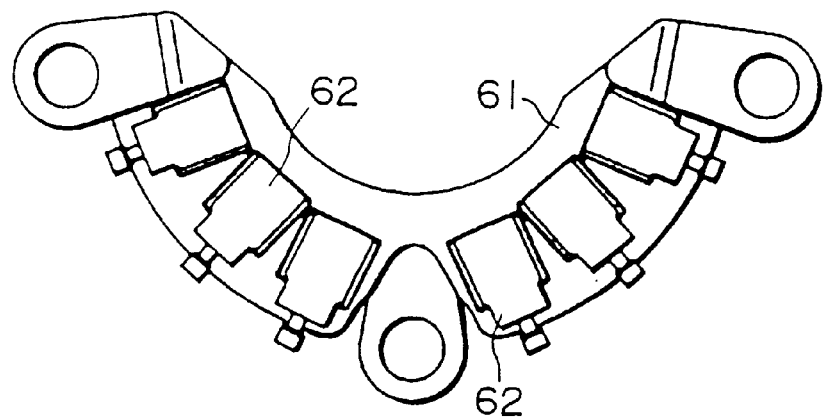
FIG. 7 is a plan of the positive-side diodes fastened to the positive-side heat sink of the rectifier in FIG. 6.
Figure 8:
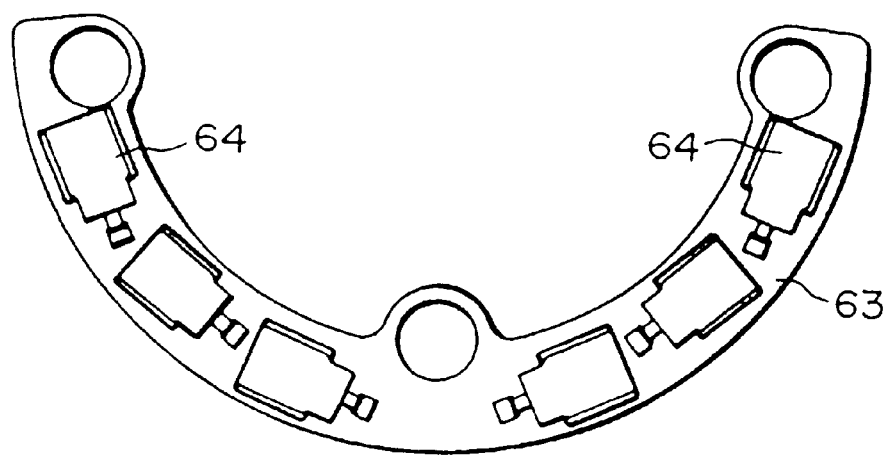
FIG. 8 is a plan of the negative-side diodes fastened to the negative-side heat sink of the rectifier in FIG. 6.

FIG. 6 is a plan of a rectifier 60 for an automotive alternator according to Embodiment 2 of the present invention, FIG. 7 is a plan of the positive-side diodes 62 fastened to the positive-side heat sink 61 of the rectifier 60 in FIG. 6, and FIG. 8 is a plan of the negative-side diodes 64 fastened to the negative-side heat sink 63 of the rectifier 60 in FIG. 6.

In Embodiment 1, there were four positive-side diodes 23 and four negative-side diodes 52, but in this embodiment, there are six positive-side diodes 62 and six negative-side diodes 64.

This example shows the case of a rectifier 60 for an automotive alternator in which two three-phase Y connected stator coils are disposed on the stator, and the three-phase alternating current from each is being rectified.

When the number of diodes is increased with a conventional diode array without increasing the size of the rectifier, because the diodes are closer together, especially on the radially inner heat sink, cooling deteriorates, and the temperature of the diodes exceeds the allowable diode temperature value, and so the radial dimension of the radially inner heat sink has had to be expanded in order to improve cooling, necessitating the enlargement of the radial dimensions of the entire rectifier.

Figure 9A:
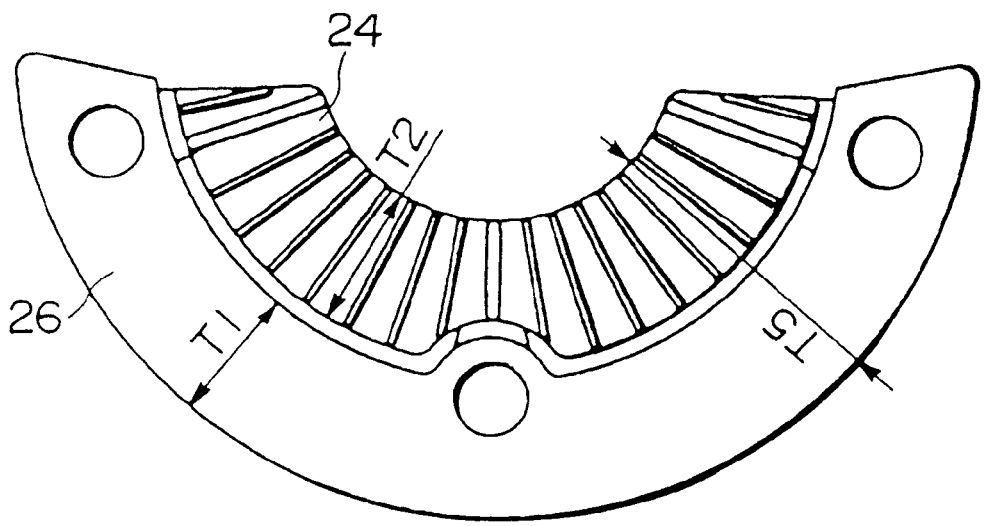
FIGS. 9 (A) and (B) are diagrams explaining the fitting together of the radial dimensions of the positive-side heat sink and the negative-side heat sink.
Figure 9B:
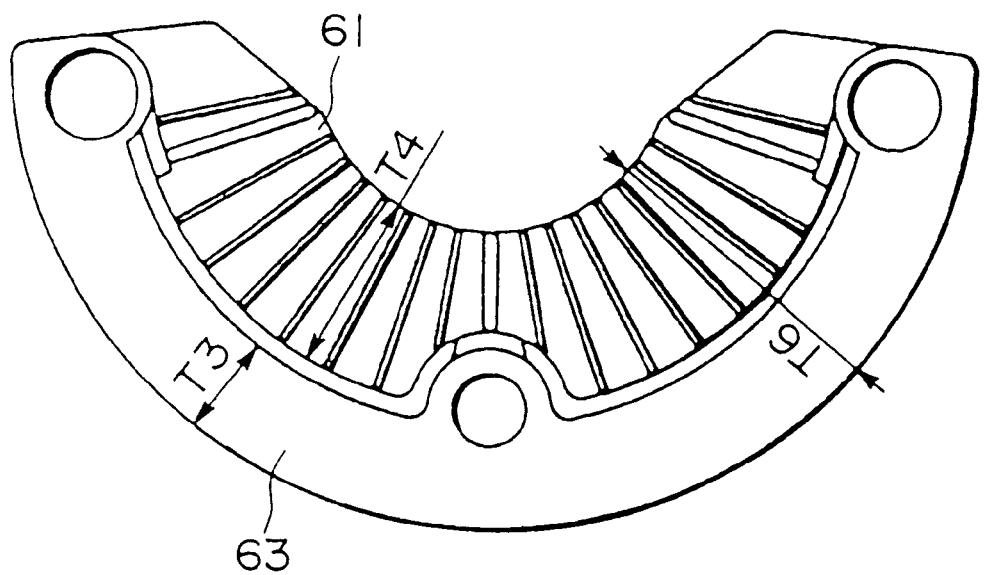
Figure 10:
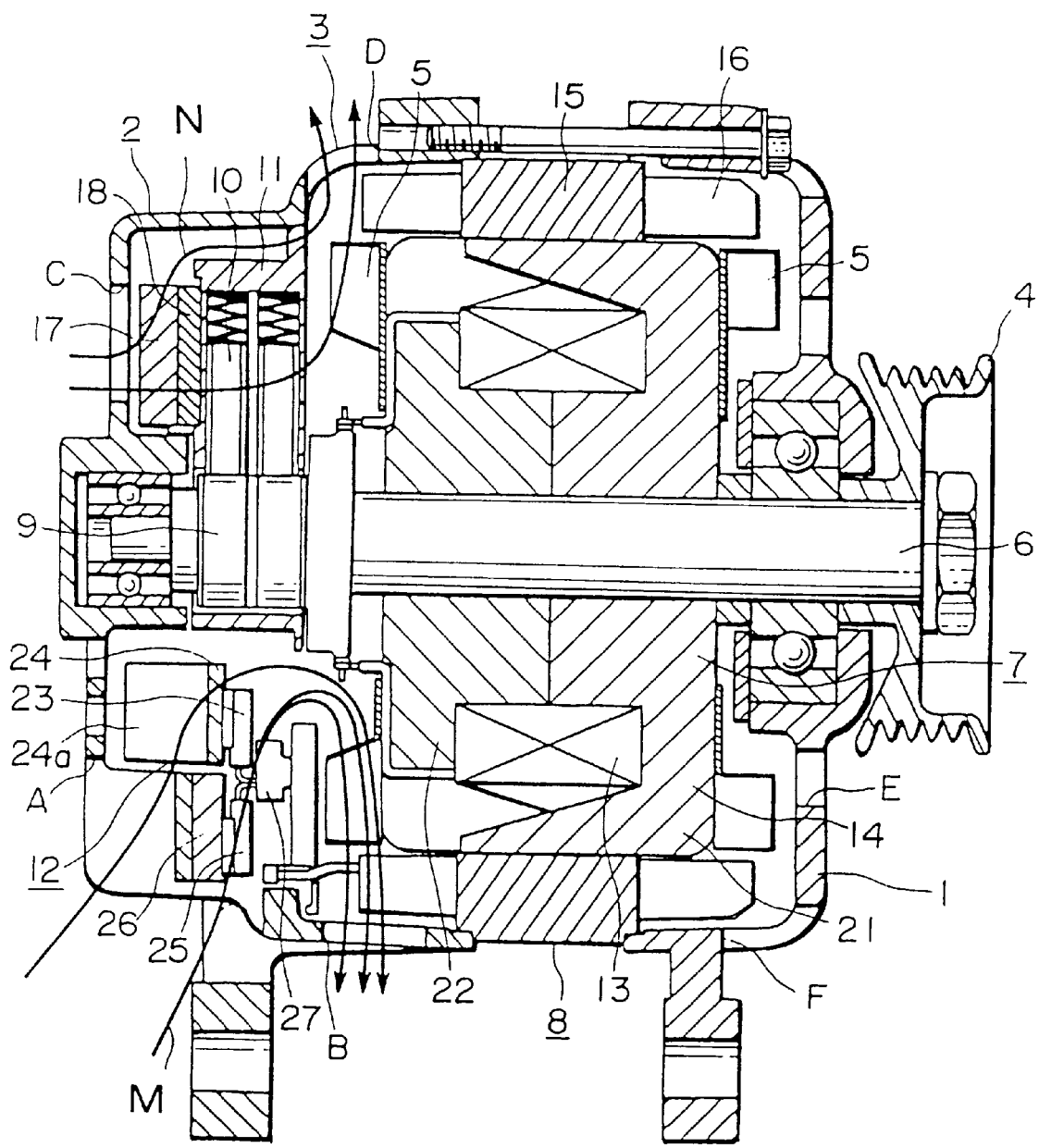
FIG. 10 is a normal cross-section of a conventional automotive alternator.
Figure 11:
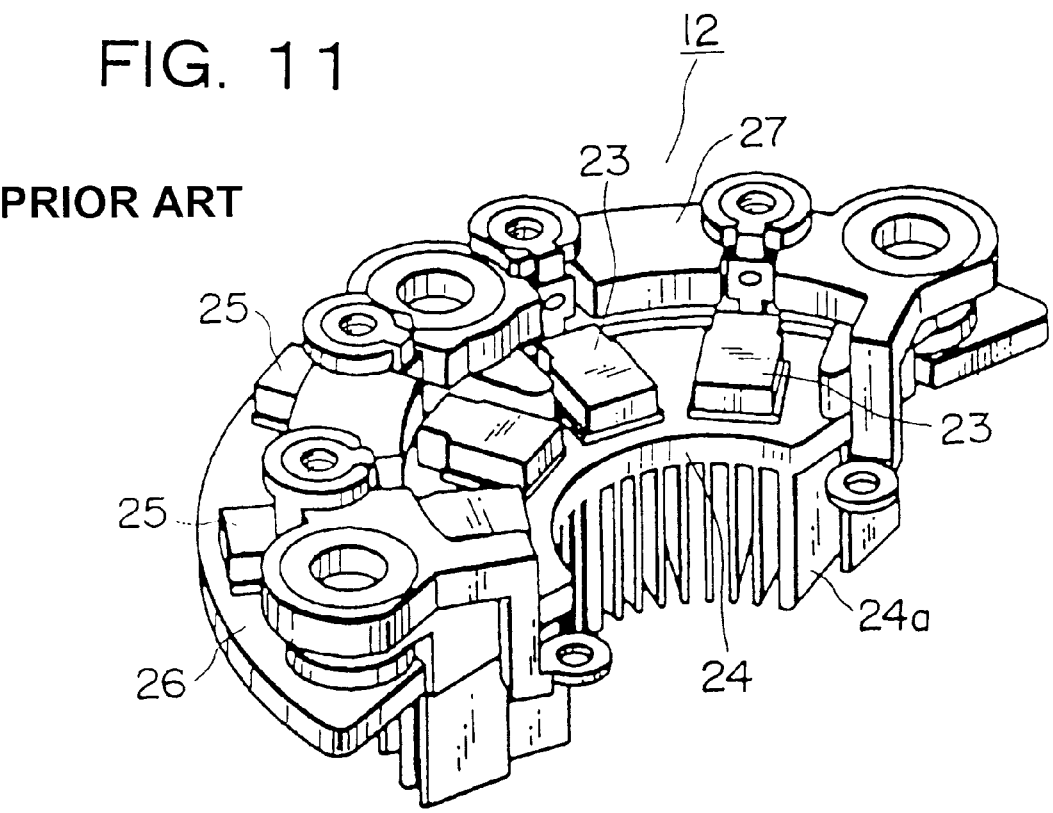
FIG. 11 is a perspective of the rectifier in FIG. 10.
Figure 12:
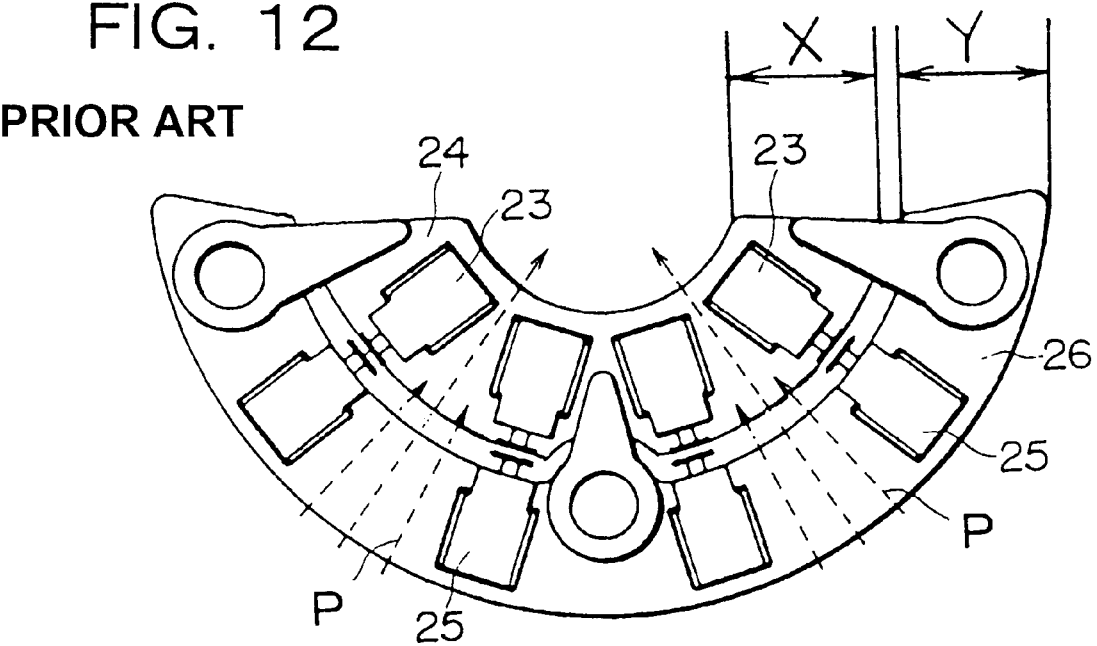
FIG. 12 is a plan of the rectifier in FIG. 10 with the circuit board removed.

In contrast thereto, in this embodiment, the longitudinal axes of the negative-side diodes 64 are lined up in the direction of the circumference of the negative-side heat sink 63, enabling the radial dimension of the radially outer negative-side heat sink 63 to be reduced, and as a result, the radial dimension of the radially inner positive-side heat sink 61 can be enlarged while maintaining the rectifier at the same size as before the number of diodes was increased, in other words, the cooling surface area of the positive-side heat sink 61 can be increased, ensuring the cooling of the positive-side diodes 62 (refer to FIGS. 9 (A) and (B): T1>T3; T4>T2; T5=T6).

Furthermore, because the degree of design freedom inside the rectifier 60 is increased, the degree of freedom to reduce pressure loss in the external air flow within rectifier 60 is increased, improving the cooling of the stator coil 16 which is cooled by the external air blowing out from the fans 5.

Moreover, in each of the above embodiments, the negative-side heat sink is disposed radially outside, and the positive-side heat sink is disposed radially inside, but the present invention can naturally also be applied to a rectifier in which the negative-side heat sink is disposed radially inside and the positive-side heat sink is disposed radially outside.

Furthermore, the present invention can naturally be applied to cases in which seven or more diodes are disposed on each of the heat sinks.

As explained above, an automotive alternator according to one aspect of the present invention comprises: a case; a shaft rotatably disposed inside the case; a rotor secured to the shaft; a stator secured to the inner wall of the case being provided with a stator coil composed of wire wound onto a stator core; and a rectifier disposed inside the case and electrically connected to the stator coil for converting alternating current generated in the stator coil to direct current, the rectifier includes: a plurality of rectangular positive-side diodes secured to a surface of an arc-shaped positive-side heat sink; and a plurality of rectangular negative-side diodes secured to a surface of an arc-shaped negative-side heat sink, the positive-side heat sink and the negative-side heat sink having different inside diameters and being both disposed on a generally flat plane perpendicularly intersecting the shaft, the longitudinal direction of each of the diodes secured to the radially inner heat sink of the positive-side and negative-side heat sinks being disposed along the radial direction of the heat sink, the longitudinal direction of each of the diodes secured to the radially outer heat sink being disposed along the circumferential direction of the heat sink, the diodes secured to the radially outer heat sink and the diodes secured to the radially inner heat sink being cooled by external air introduced into the case by the rotation of fans mounted to the rotor. Therefore, the radial dimensions of the rectifier can be reduced, enabling reductions in size, as well as improving cooling of the diodes secured to the radially outer heat sink.

According to one form of the automotive alternator, the radial dimension of the radially inner heat sink may be greater than the radial dimension of the radially outer heat sink. Therefore, the cooling of the diodes secured to the radially inner heat sink can be improved, the degree of freedom in placing the diodes is also increased, and pressure loss in the external air flow can be reduced, improving the cooling of the stator on the downstream side of those diodes, for example.

According to another form of the automotive alternator, the surface area of the radially inner heat sink may be greater than the surface area of the radially outer heat sink. Therefore, the same effects as described above can be achieved.

According to still another form of the automotive alternator, the positive-side diodes and the negative-side diodes may be disposed such that air gap portions between the positive-side diodes and air gap portions between the negative-side diodes may be radially aligned. Therefore, external air flows smoothly inside the rectifier, improving the cooling of the positive-side and negative-side diodes.

According to another form of the automotive alternator, a plurality of fins extending in the axial direction of the rotor may be disposed on the reverse side of the radially inner heat sink. Therefore, the contact surface area between the external air and the heat sinks is increased, improving the cooling of the diodes secured to the heat sinks.

According to still another form of the automotive, the heat sinks may be composed of aluminum. Therefore, the diodes can be cooled cheaply and efficiently.

According to another form of the automotive, a stator coil comprising three-phase Y-connected wire may be disposed on the stator core; and four diodes each may be secured to the radially inner heat sink and the radially outer heat sink. Therefore, a compact, well-cooled, automotive alternator with a three-phase Y connection can be achieved simply.

According to still another form of the automotive, two stator coils comprising three-phase Y-connected wire may be disposed on the stator core; and six diodes each may be secured to the radially inner heat sink and the radially outer heat sink. Therefore, a compact, well-cooled, automotive alternator with two three-phase Y connections can be achieved simply.

What is claimed is:

1. An automotive alternator comprising:

a case;

a shaft rotatably disposed inside said case;

a rotor secured to said shaft;

a stator secured to an inner wall of said case being provided with a stator coil composed of wire wound onto a stator core; and a rectifier disposed inside said case and electrically connected to said stator coil for converting alternating current generated in said stator coil to direct current, said rectifier including:

a plurality of rectangular positive-side diodes secured to a surface of an arc-shaped positive-side heat sink; and a plurality of rectangular negative-side diodes secured to a surface of an arc-shaped negative-side heat sink, said positive-side heat sink and said negative-side heat sink having different inside diameters and being both disposed on a generally flat plane perpendicularly intersecting said shaft, the longitudinal direction of each of said diodes secured to the radially inner heat sink of said positive-side and negative-side heat sinks being disposed along the radial direction of said heat sink, the longitudinal direction of each of said diodes secured to the radially outer heat sink being disposed along the circumferential direction of said heat sink, said diodes secured to said radially outer heat sink and said diodes secured to said radially inner heat sink being cooled by external air introduced into said case by the rotation of fans mounted to said rotor.

2. The automotive alternator according to claim 1 wherein the radial dimension of said radially inner heat sink is greater than the radial dimension of said radially outer heat sink.

3. The automotive alternator according to claim 2 wherein the surface area of said radially inner heat sink is greater than the surface area of said radially outer heat sink.

4. The automotive alternator according to claim 1 wherein said positive-side diodes and said negative-side diodes are disposed such that air gap portions between said positive-side diodes and air gap portions between said negative-side diodes are radially aligned.

5. The automotive alternator according to claim 1 wherein a plurality of fins extending in the axial direction of the rotor are disposed on the reverse side of said radially inner heat sink.

6. The automotive alternator according to claim 1 wherein said heat sinks are composed of aluminum.

7. The automotive alternator according to claim 1 wherein:

a stator coil comprising three-phase Y-connected wire is disposed on said stator core; and four diodes each are secured to said radially inner heat sink and said radially outer heat sink.

8. The automotive alternator according to claim 1 wherein:

two stator coils comprising three-phase Y-connected wire are disposed on said stator core; and six diodes each are secured to said radially inner heat sink and said radially outer heat sink.

* * * * *